United States Patent
Li

(10) Patent No.: US 9,953,621 B2
(45) Date of Patent: Apr. 24, 2018

(54) METHOD AND APPARATUS FOR SHORTENING IMAGE DELAY, AND VIRTUAL REALITY APPARATUS

(71) Applicant: Beijing Pico Technology Co., Ltd., Hai Dian District (CN)

(72) Inventor: Ligang Li, Hai Dian District (CN)

(73) Assignee: Beijing Pico Technology Co., Ltd., Hai Dian District (CN)

( * ) Notice: Subject to any disclaimer, the term of this patent is extended or adjusted under 35 U.S.C. 154(b) by 0 days.

(21) Appl. No.: 15/253,625

(22) Filed: Aug. 31, 2016

(65) Prior Publication Data

US 2017/0352334 A1    Dec. 7, 2017

(30) Foreign Application Priority Data

Jun. 7, 2016 (CN) .......................... 2016 1 0403732

(51) Int. Cl.
| | |
|---|---|
| *G09G 5/393* | (2006.01) |
| *G09G 5/395* | (2006.01) |
| *G06T 1/20* | (2006.01) |
| *G06T 1/60* | (2006.01) |

(52) U.S. Cl.
CPC ............... *G09G 5/395* (2013.01); *G06T 1/20* (2013.01); *G06T 1/60* (2013.01); *G09G 5/393* (2013.01); *G09G 2310/04* (2013.01); *G09G 2320/0252* (2013.01); *G09G 2360/18* (2013.01)

(58) Field of Classification Search
None
See application file for complete search history.

(56) References Cited

U.S. PATENT DOCUMENTS

| | | | | |
|---|---|---|---|---|
| 6,166,748 A | * | 12/2000 | Van Hook | A63F 13/00 345/522 |
| 2006/0170691 A1 | * | 8/2006 | Lee | G09G 5/393 345/531 |
| 2011/0299785 A1 | * | 12/2011 | Albu | G06F 3/1454 382/209 |
| 2016/0080687 A1 | * | 3/2016 | Matsui | H04N 5/765 386/353 |

* cited by examiner

*Primary Examiner* — Joni Richer
(74) *Attorney, Agent, or Firm* — LKGlobal | Lorenz & Kopf, LLP

(57) ABSTRACT

A method for shortening image delay includes, but is not limited to refreshing a current frame image from a frame buffer area to the display screen from top to bottom, and notifying an application to draw next frame image when the current frame image is refreshed to a predetermined row. The method further includes updating content in predetermined rows from top of next frame image drawn by the application to the frame buffer area of the system, and replacing content in the predetermined rows of the current frame image that have already been displayed The method further includes updating the content in the remaining rows of next frame image drawn by the application to the frame buffer area, and replacing content in the remaining rows of the current frame image that have already been displayed.

11 Claims, 2 Drawing Sheets

METHOD AND APPARATUS FOR SHORTENING IMAGE DELAY, AND VIRTUAL REALITY APPARATUS

CROSS-REFERENCE TO RELATED APPLICATIONS

This application claims priority to Chinese Patent Application No. 201610403732.4 filed Jun. 7, 2016, which is incorporated herein by reference in its entirety.

TECHNICAL FIELD

This application pertains to the technical field of virtual reality, and specifically to a method and apparatus for shortening image delay, and a virtual reality apparatus.

BACKGROUND

In recent years, as virtual reality (abbreviated as VR) technology gradually becomes mature, various virtual reality apparatus arise gradually. Due to Android open source property and sound ecological system, many virtual reality apparatuses are developed based on Android system.

A display procedure of current Android application generally includes two portions: application-side drawing and system-side rendering. For example, Android application invokes SurfaceFlinger service to render, to a display screen, Surface which has passed through measurement, layout and drawing. Generally, when an image is drawn, a so-called "dual buffer" technology is employed. Dual buffer means that two buffer areas (SharedBufferStack) are used: one is called FrontBuffer, and the other is called Backbuffer. A display end processes the FrontBuffer, while a Central Processing Unit (CPU) and a Graphics Processing Unit (GPU) process the BackBuffer. Based on a display refresh mechanism, the image is always drawn in the BackBuffer first, then exchanged with the FrontBuffer, and rendered on the display screen.

In a virtual reality system, there is very crucial index, namely, delay from movement to display, for example, namely, a time period required from a moment when the user's head position changes to a moment when the application draws a corresponding image according to the change and finally displays the image on the display screen. To obtain an optimal user experience, the time period must be very short, preferably so short that the user by no means feels it. If the delay is too long, the user will feel the image shaking and feels dizzy, and the user's experience is undesirable. However, since Android system is not designed for a virtual reality apparatus, the current image display of Android causes the image of the virtual reality apparatus to experience a longer delay from rendering to display, and the user's experience is undesirable.

In addition, other objects, desirable features and characteristics will become apparent from the subsequent summary and detailed description, and the appended claims, taken in conjunction with the accompanying drawings and this background.

SUMMARY

The present disclosure provides a method and apparatus for shortening image delay and a virtual reality apparatus, to solve the problem that image display employing Android causes longer image delay of the virtual reality apparatus from rendering to display, and the user's experience is not optimal.

According to an aspect of the present disclosure, there is provided a method of shortening image delay, the method comprising:

refreshing a current frame image from a frame buffer area of a system to the display screen from top to bottom, and notifying an application to draw next frame image when the current frame image is refreshed to a predetermined row;

when refreshing content in remaining rows of the current frame image, updating content in predetermined rows from top of next frame image drawn by the application to the frame buffer area of the system, and replacing content in the predetermined rows of the current frame image that have already been displayed;

when beginning to refresh the content in the predetermined rows from top of said next frame image after having received a frame synchronization signal of said next frame image, updating the content in the remaining rows of next frame image drawn by the application to the frame buffer area, and replacing content in the remaining rows of the current frame image that have already been displayed.

According to another aspect of the present disclosure, there is provided an apparatus for shortening image delay, the apparatus comprising:

a refreshing unit configured to refresh a current frame image from a frame buffer area of the system to a display screen from top to bottom, and notify a frame image drawing unit to draw next frame image when the current frame image is refreshed to a predetermined row;

a frame image drawing unit configured to draw next frame image according to the notification from the refreshing unit;

a frame image updating unit configured to, when the refreshing unit refreshes content in remaining rows of the current frame image, update content in predetermined rows from top of next frame image drawn by the frame image drawing unit to the frame buffer area of the system, and replace content in the predetermined rows of the current frame image that have already been displayed; when the refreshing unit begins to refresh the content in the predetermined rows from top of said next frame image after having received a frame synchronization signal of said next frame image, update the content in the remaining rows of next frame image drawn by the frame image drawing unit to the frame buffer area, and replace content in the remaining rows of the current frame image that have already been displayed.

According to a further aspect of the present disclosure, there is provided a virtual reality apparatus, comprising: the apparatus for shortening image delay according to said another aspect of the present disclosure.

Advantageous effects of the present disclosure are as follows: according to the method and apparatus for shortening image delay in the present disclosure, first, only a front-end frame buffer area (namely, Frontbuffer) is needed for buffering, and there is no need to modify the size of the frame buffer area, and then the current frame image in this frame buffer area is refreshed onto the display screen from top to bottom. Since partial content of the current frame image has already been refreshed onto the display screen and display thereof has already been completed, the frame buffer area space previously occupied by the partial content of the current frame image may be replaced with partial content of next frame image, content of next frame image may be updated into the frame buffer area without waiting for completion of refresh of the current frame image, thereby shortening the processing time of the image from drawing to display, shortening the image delay and optimizing the user's experience.

Secondly, such updating of the frame buffer area in segments according to the present disclosure is implemented according to the frame synchronization signal. That is to say, in surplus time of the frame synchronization signal of the current frame each time, content in a upper portion of next frame image is updated to the frame buffer area. Since a display driver begins to read next frame according to the frame synchronization signal, the display driver does not begin to read next frame from the first row of the frame buffer area at this time, and instead it continues to read the remaining rows of the current frame. After the frame synchronization signal of next frame image is received, the display drivers begins to read content in the first row of next frame, and at this time the remaining content in next frame is updated to the frame buffer area of the system. As such, this avoids image tearing problem that might occur upon using a frame buffer area to perform image refreshing, and widens the scope of application of the virtual reality apparatus.

In addition, embodiments of the present disclosure further provide a virtual reality apparatus. Since the virtual reality apparatus comprises the apparatus for shortening image delay of the present disclosure. Application in such virtual reality apparatus may draw a corresponding image according to the user's motion (e.g., the head motion) and display it onto the display screen quickly in real time, thereby provide optimal user experience and improve competitive power of the products.

BRIEF DESCRIPTION OF DRAWINGS

The present invention will hereinafter be described in conjunction with the following drawing figures, wherein like numerals denote like elements, and.

DETAILED DESCRIPTION

Figure 1:
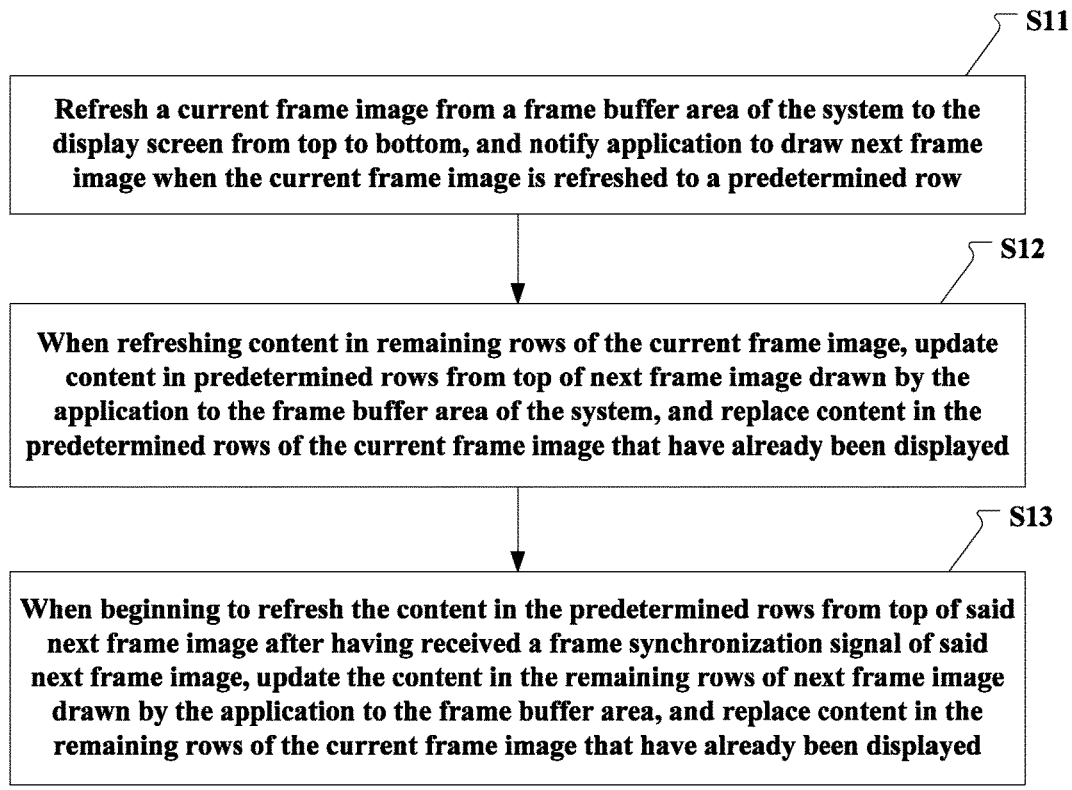
FIG. 1 is a flow chart of a method of shortening image delay according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

A current technology of shortening image delay is to propose using one FrontBuffer to render based on the characteristic that a mobile phone screen is placed transversely using VR application, and the screen is refreshed from left to right. When the left side of the screen (displaying content corresponding to the left eye) is refreshing, buffer data corresponding to an image on the right side of the screen (displaying content corresponding to the right eye) is updated; when the right side of the screen is refreshing, buffer data corresponding to an image on the left side of the screen is updated, thereby getting round a display synthesis mechanism of a system software manner, and shortening the delay. However, this technology is only adapted for the screen refreshing from left to right. The display screens used by most current virtual reality apparatuses refresh from top to bottom, and cannot use this current technology for rendering. Furthermore, this current technology is apt to image tearing problem upon display fresh. Image tearing refers to a phenomenon that the displayed image is formed by combining two portions, namely, a current frame and a preceding frame.

A design idea of the present disclosure is as follows: with respect to the problem that the image delay from the drawing to display existing in the current Android display mechanism causes the undesirable user's experience of the virtual reality apparatus, the present disclosure directly uses Frontbuffer to render to avoid the display synthesis mechanism of the system, saves handover time between buffer areas and processing time occupied by SurfaceFlinger service and thereby shortens delay. In addition, with respect to the image tearing problem that is apt to occur upon display refresh in the prior art, the technical solution of the present disclosure proposes updating a frame buffer area according to frame synchronization signal segments. As such, the image delay is shortened, the user's experience is improved, and the virtual reality apparatus is enabled to employ a display screen that performs refresh from top to bottom, image tearing will not occur, and the product's competitive power is improved.

Embodiment 1

FIG. 1 is a flow chart of a method of shortening image delay according to an embodiment of the present disclosure. Referring to FIG. 1, the method of shortening image delay comprises the following steps:

Step S11: refreshing a current frame image from a frame buffer area of the system to the display screen from top to bottom, and notifying application to draw next frame image when the current frame image is refreshed to a predetermined row;

Step S12: when refreshing content in remaining rows of the current frame image, updating content in predetermined rows from top of next frame image drawn by the application to the frame buffer area of the system, and replacing content in the predetermined rows of the current frame image that have already been displayed;

Step S13: when beginning to refresh the content in the predetermined rows from top of said next frame image after having received a frame synchronization signal of said next frame image, updating the content in the remaining rows of next frame image drawn by the application to the frame buffer area, and replacing content in the remaining rows of the current frame image that have already been displayed.

As known from the method of shortening image delay as shown in FIG. 1, the present embodiment needn't modify a size of a current front-end buffer area (namely, Frontbuffer) of the system. As such, there is no need to modify an output mode of a display driver, the method may be directly used on any system which provides the Frontbuffer, and has a better applicability. In addition, the method of the present embodiment uses the frame synchronization signal to update next frame image segment into the Frontbuffer while the display driver refreshes the current frame from top to bottom (namely, updating content in predetermined rows from top first, and then updating content in the remaining rows). In this way, on one hand, the SurfaceFlinger software syntheses mechanism in the prior art is avoided, and the processing time occupied by SurfaceFlinger service is saved. Furthermore, next frame image may be updated into the Frontbuffer without waiting for completion of update of the current frame, thereby saving the waiting time of next frame image, substantially shortening the delay and optimizing the user's experience. On the other hand, since the frame synchronization signal is used for control when buffer is performed in a buffer area, image tearing problem will not occur so that the Android system is more compatible with the virtual reality apparatus.

Embodiment 2

The present embodiment focuses on the procedure for implementing the method of shortening image delay. Reference is made to other embodiments of the present disclosure for other content. A specific implementation mode of the method of shortening image delay is as follows:

Step 1): when the current frame outputs to one half, APP (Application) generates an image to be displayed in next frame in a manner such as rendering or timewarp, and stores the image into a temporary buffer area;

Step 2): prior to VSync frame synchronization signal of next frame, updating content in a upper half of next frame image to the Frontbuffer;

Step 3): after VSync frame synchronization signal of next frame, the system begins to output the upper half of next frame, and at this time, updates image content in the lower half of next frame into the Frontbuffer.

Noticeably, the current frame outputting to one half in step 1) is only an illustrative example. Control is performed according to the set predetermined row upon actual application, and the predetermined row may be adjusted according to an arrival time of the frame synchronization signal of next frame image, a time when the application draws an image, and a time needed by updating, and is not limited to one half of the current frame image described in the present embodiment. For example, one frame image may be divided into ten rows, and the predetermined row may be set as the fifth row or the seventh row, and is not limited in this regard. That is to say, a time point on which new frame image begins to be generated may be adjusted according to actual situations to approach a time point of next VSync frame synchronization signal as much as possible, but it must be ensured that there is enough time to draw and update the image to the Frontbuffer.

Here, in step 2), updating the content in the upper half of next frame image into the Frontbuffer may be implemented in two manners: one is updating, in one time, content in the predetermined rows from top of next frame image that has already been drawn and stored by the application, from the temporary buffer area to a frame buffer area of the system. The other implementation manner is updating, in many times, content in the predetermined rows from top of next frame image to the frame buffer area of the system from top to bottom. That is to say, updating is not certainly performed in one time, and it may be divided into more segments and performed from top to bottom to reduce time spent in updating each time.

For example, one frame image is divided into ten rows, and the predetermined row is the fifth row, content in upper five rows may be updated to the frame buffer area in one time in step 2). Alternatively, content in upper three rows in content in upper five rows may be updated to the frame buffer area together, and then content in last two rows in content in upper five rows may be updated into the frame buffer area together.

It needs to be appreciated that in the present embodiment illustrates that updating may be performed in multiple segments upon updating the content in the previous predetermined rows. However, those skilled in the art can understand that updating may also be performed in multiple segments upon updating the content in the remaining rows, not limited to updating the content in the remaining rows to the frame buffer area of the system in one time.

In addition, step 1) illustrates that App stores duly-drawn next frame image into a temporary buffer area. However, it needs to be appreciated that the temporary buffer area may not be used in an actual application procedure, and instead, next frame image is directly updated to the frame buffer area of the system. This manner of directly updating next frame image to the frame buffer area of the system may be implemented in the following manner: when the application draws next frame image, it sets a drawing target to be the frame buffer area of the system rather than the temporary buffer area, then an image scissors (e.g., glScissor of opengl) is used to shear the newly-drawn image so that only one half (or other predetermined portions) of the area is updated each time. Implementing logic is identical with drawing to the temporary buffer area first and then updating from the temporary buffer area to the frame buffer area. A clipping function may be used to control the size of each update, for example, as for content in predetermined rows drawn by the application each time by employing parameters and data of the same frame image, the clipping function is used to clip, and retain content newly drawn each time to be updated to the frame buffer area of the system. That is to say, it is uncertain to buffer the image generated by the App, but instead, the same parameters and data are used each time to generate a new image, and control is performed in a manner such as glscissor to update only a portion of the Frontbuffer each time.

As known from the above, the method of shortening image delay according to the present embodiment may reduce image delay time from rendering to display and thereby enable the virtual reality apparatus to provide a better user experience.

Embodiment 3

Figure 2:
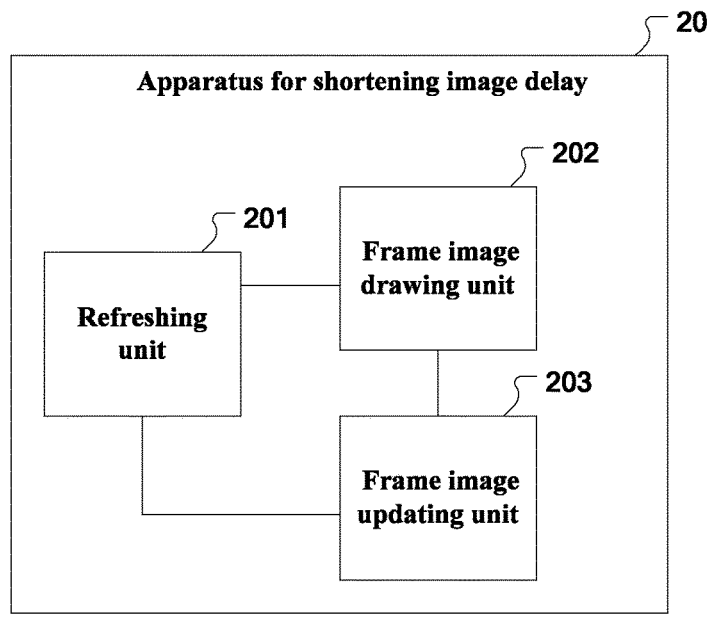
FIG. 2 is a block diagram of an apparatus for shortening image delay according to an embodiment of the present disclosure.

FIG. 2 is a block diagram of an apparatus for shortening image delay according to an embodiment of the present disclosure. The apparatus 20 for shortening image delay comprises:

A refreshing unit 201 configured to refresh a current frame image from a frame buffer area of the system to the display screen from top to bottom, and notify a frame image drawing unit 202 to draw next frame image when the current frame image is refreshed to a predetermined row;

a frame image drawing unit 202 configured to draw next frame image according to the notification from the refreshing unit 201;

a frame image updating unit 203 configured to, when the refreshing unit 201 refreshes content in remaining rows of the current frame image, update content in predetermined rows from top of next frame image drawn by the frame image drawing unit 202 to the frame buffer area of the system, and replace content in the predetermined rows of the current frame image that have already been displayed; when the refreshing unit 201 begins to refresh the content in the predetermined rows from top of said next frame image after having received a frame synchronization signal of said next frame image, update the content in the remaining rows of next frame image drawn by the frame image drawing unit 202 to the frame buffer area, and replace content in the remaining rows of the current frame image that have already been displayed.

In the present embodiment, the refreshing unit 201 is specifically configured to adjust the predetermined row according to an arrival time of the frame synchronization signal of said next frame image, a time when the application draws an image, and a time needed by updating.

In the present embodiment, the frame image updating unit 203 comprises: a first updating subunit and a second updating subunit, The first updating subunit is configured to update content in predetermined rows from top of next frame image drawn by the frame image drawing unit 202 from the temporary buffer area to the frame buffer area of the system;

the second updating subunit is configured to directly update content in predetermined rows from top of next frame image drawn by the frame image drawing unit in the frame buffer area of the system.

In the present embodiment, The first updating subunit is specifically configured to update, in one time, content in the predetermined rows from top of next frame image drawn by the frame image drawing unit from the temporary buffer area to the frame buffer area of the system, or update, in many times, content in the predetermined rows from top of said next frame image to the frame buffer area of the system from top to bottom.

In the present embodiment, The second updating subunit is specifically used to, when the frame image drawing unit draws next frame image, set a drawing target to be content in predetermined rows in the frame buffer area of the system drawn each time by employing parameters and data of the same frame image, use a clipping function to clip, and retain content newly drawn each time to be updated to the frame buffer area of the system.

Noticeably, the working procedure of the apparatus for shortening image delay in the present embodiment corresponds to steps of the above-mentioned method of shortening image delay, so reference may be made to related depictions of the aforesaid embodiment of the present disclosure for undescribed portions of the working procedure of the apparatus for shortening image delay in the present embodiment, and no detailed depictions will be given here.

Embodiment 4

Figure 3:
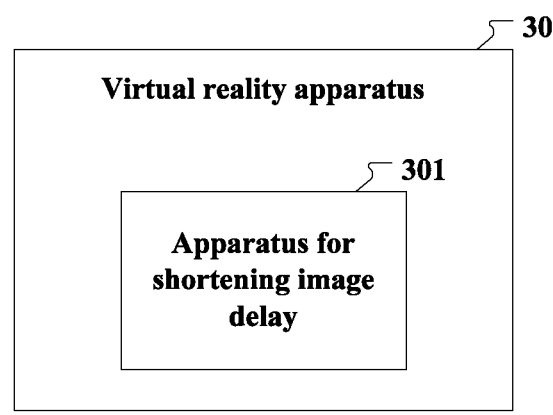
FIG. 3 is a block diagram of a virtual reality apparatus according to an embodiment of the present disclosure.

FIG. 3 is a block diagram of a virtual reality apparatus according to an embodiment of the present disclosure. Referring to FIG. 3, the virtual reality apparatus 30 comprises: the apparatus 301 for shortening image delay according to the present disclosure. Reference may be made to detailed description of the apparatus 20 for shortening the image delay as stated in the aforesaid Embodiment 3 for an implementation principle and working procedure of the apparatus 301 for shortening image delay.

To conclude, according to the method and apparatus for shortening image delay in the present disclosure, first, only a front-end frame buffer area (namely, Frontbuffer) is needed for buffering, and there is no need to modify the size of the frame buffer area, and then the current frame image in this frame buffer area is refreshed onto the display screen from top to bottom. Since partial content of the current frame image has already been refreshed onto the display screen and display thereof has already been completed, the frame buffer area space previously occupied by the partial content of the current frame image may be replaced with partial content of next frame image, content of next frame image may be updated into the frame buffer area without waiting for completion of refresh of the current frame image, thereby shortening the processing time of the image from drawing to display, shortening the image delay and optimizing the user's experience.

Secondly, such updating of the frame buffer area in segments according to the present disclosure is implemented according to the frame synchronization signal. That is to say, in surplus time of the frame synchronization signal of the current frame each time, content in an upper portion of next frame image is updated to the frame buffer area. Since a display driver begins to read next frame according to the frame synchronization signal, the display driver does not begins to read next frame from the first row of the frame buffer area at this time, and instead it continues to read the remaining rows of the current frame. After the frame synchronization signal of next frame image is received, the display drivers begins to read content in the first row of next frame, and at this time the remaining content in next frame is updated to the frame buffer area of the system. As such, this avoids image tearing problem that might occur upon using a frame buffer area to perform image refreshing, and widens the scope of application of the virtual reality apparatus.

In addition, embodiments of the present disclosure further provide a virtual reality apparatus. Since the virtual reality apparatus comprises the apparatus for shortening image delay of the present disclosure, Application in such virtual reality apparatus may draw a corresponding image according to the user's motion (e.g., the head motion) and display it onto the display screen quickly in real time, thereby provide optimal user experience and improve competitive power of the products.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of shortening image delay, wherein the method comprises:
   refreshing a current frame image from a frame buffer area to a display screen from top to bottom, and notifying a processor to draw next frame image when the current frame image is refreshed to a predetermined row;
   when refreshing content in remaining rows of the current frame image, updating content in predetermined rows from top of next frame image drawn by the processor to the frame buffer area, and replacing content in the predetermined rows of the current frame image that have already been displayed;
   when beginning to refresh the content in the predetermined rows from top of said next frame image after having received a frame synchronization signal of said next frame image, updating the content in the remaining rows of next frame image drawn by the processor to the frame buffer area, and replacing content in the remaining rows of the current frame image that have already been displayed.

2. The method according to claim 1, wherein the predetermined row is adjusted according to an arrival time of the frame synchronization signal of said next frame image, a time when the processor draws an image, and a time needed by updating.

3. The method according to claim 2, wherein the updating content in predetermined rows from top of next frame image drawn by the processor to the frame buffer area comprises:
updating content in predetermined rows from top of next frame image drawn by the processor from a temporary buffer area to the frame buffer area, or directly updating content in predetermined rows from top of next frame image to be drawn by the processor into the frame buffer area.

4. The method according to claim 3, wherein the updating content in predetermined rows from top of next frame image drawn by the processor from the temporary buffer area to the frame buffer area comprises:
updating, in one time, content in the predetermined rows from top of next frame image drawn by processor from the temporary buffer area to the frame buffer area; or update, in many times, content in the predetermined rows from top of next frame image to the frame buffer area from top to bottom.

5. The method according to claim 3, wherein the directly updating content in predetermined rows from top of next frame image to be drawn by the processor into the frame buffer area comprises:
as for content in predetermined rows drawn by the processor each time by employing parameters and data of the same frame image, using a clipping function to clip, and retaining content newly drawn each time to be updated to the frame buffer area.

6. An apparatus for shortening image delay, which comprises a processor, a display screen, a frame buffer area, wherein the processor is configured to:
refresh a current frame image from the frame buffer area to the display screen from top to bottom, and draw next frame image when the current frame image is refreshed to a predetermined row;
when refreshes content in remaining rows of the current frame image, update content in predetermined rows from top of the next frame image to the frame buffer area, and replace content in the predetermined rows of the current frame image that have already been displayed; and when begins to refresh the content in the predetermined rows from top of said next frame image after having received a frame synchronization signal of said next frame image, update the content in the remaining rows of the next frame image to the frame buffer area, and replace content in the remaining rows of the current frame image that have already been displayed.

7. The apparatus according to claim 6, wherein the predetermined row is adjusted according to an arrival time of the frame synchronization signal of said next frame image, a time when the processor draws an image, and a time needed by updating.

8. The apparatus according to claim 7, wherein the apparatus further comprises a temporary buffer area, wherein said update content in predetermined rows from top of the next frame image to the frame buffer area comprises:
updating content in predetermined rows from top of next frame image from the temporary buffer area to the frame buffer area; or
directly updating content in predetermined rows from top of next frame image in the frame buffer area.

9. The apparatus according to claim 8, wherein said updating content in predetermined rows from top of next frame image from the temporary buffer area to the frame buffer area comprises:
updating, in one time, content in the predetermined rows from top of the next frame image from the temporary buffer area to the frame buffer area, or updating, in many times, content in the predetermined rows from top of said next frame image to the frame buffer area from top to bottom.

10. The apparatus according to claim 8, wherein said directly updating content in predetermined rows from top of next frame image in the frame buffer area comprises:
when the processor draws the next frame image, set a drawing target to be content in predetermined rows in the frame buffer area drawn each time by employing parameters and data of the same frame image, use a clipping function to clip, and retain content newly drawn each time to be updated to the frame buffer area.

11. A virtual reality apparatus, wherein the virtual reality apparatus comprises: the apparatus for shortening image delay according to claim 6.

* * * * *